United States Patent [19]
Wang et al.

[11] Patent Number: 5,448,731
[45] Date of Patent: Sep. 5, 1995

[54] METHOD AND APPARATUS FOR CONTROLLING THE DEFERRED EXECUTION OF USER REQUESTS IN A DATA PROCESSING SYSTEM

[75] Inventors: Diana S. Wang, Trophy Club; Marvin L. Williams, Lewisville, both of Tex.

[73] Assignee: International Business Machines Corporation, Armonk, N.Y.

[21] Appl. No.: 616,164

[22] Filed: Nov. 20, 1990

[51] Int. Cl.⁶ .......................... G06F 7/00; G06F 15/16
[52] U.S. Cl. .................................... 395/650; 395/200; 364/281.3; 364/281.8; 364/284.3; 364/284.4; 364/DIG. 2
[58] Field of Search .................. 364/DIG. 1, DIG. 2; 395/650

[56] References Cited

U.S. PATENT DOCUMENTS

| | | | |
|---|---|---|---|
| 4,073,005 | 2/1978 | Parkin | 364/200 |
| 4,503,499 | 3/1985 | Mason et al. | 364/200 |
| 4,642,756 | 2/1987 | Sherrod | 364/200 |
| 4,769,771 | 9/1988 | Lippmann et al. | 395/200 |
| 4,805,107 | 2/1989 | Kieckhafer et al. | 395/650 |
| 4,811,203 | 3/1989 | Hamstra | 364/200 |
| 4,908,758 | 3/1990 | Sanders | 364/300 |
| 4,924,426 | 5/1990 | Kameda et al. | 364/900 |
| 4,962,532 | 10/1990 | Kasiraj et al. | 380/25 |
| 4,969,092 | 11/1990 | Shorter | 364/200 |
| 4,985,831 | 1/1991 | Dulong | 395/650 |
| 5,047,918 | 9/1991 | Schwartz et al. | 364/200 |

FOREIGN PATENT DOCUMENTS

| | | | |
|---|---|---|---|
| 0362106A2 | 4/1990 | European Pat. Off. | G06F 9/46 |
| 0371610A2 | 6/1990 | European Pat. Off. | G06F 13/14 |

OTHER PUBLICATIONS

IBM Technical Disc. Bulletin vol. 26 No. 9, Feb. 1984, P-4862, D. J. Blaszak et al. "Priority Background Jobs For Multistation Processing System".

*Primary Examiner*—Kevin A. Kriess
*Assistant Examiner*—L. Toplu
*Attorney, Agent, or Firm*—Jonathan E. Jobe; Andrew J. Dillon

[57] ABSTRACT

A method and apparatus are disclosed for controlling the deferred execution of user requests in a data processing system. In the depicted embodiment of the present invention, each deferred user request includes a plurality of user defined attributes which may include a desired time of execution, a relative importance assigned, a ranking of the request security level and an indication of the organization level of the user for each deferred request. A deferred application request service is then established and utilized to evaluate the attributes associated with each deferred user request. The order of execution of each deferred request is then determined by the evaluation of each of these user specified attributes, in a specified order. A user specified precedence value for each attribute may be utilized in order to resolve conflicts in the order of execution between multiple deferred requests.

5 Claims, 4 Drawing Sheets

| | A | B | C | D |
|---|---|---|---|---|
| | Time After Request | User Assigned Importance | Security Rating of Request | Ranking of User |
| | > | < | < | > |
| File 1234 | 10 | 1 | 3 | 1 |
| Mail 5243 | 5 | 2 | 1 | 2 |
| Delete 12 | 3 | 4 | 2 | 1 |
| Cancel 34 | 5 | 2 | 1 | 2 |

METHOD AND APPARATUS FOR CONTROLLING THE DEFERRED EXECUTION OF USER REQUESTS IN A DATA PROCESSING SYSTEM

BACKGROUND OF THE INVENTION

1. Technical Field

The present invention relates in general to data processing systems and in particular to distributed data processing systems which permit the deferred execution of application software requests. Still more particularly, the present invention relates to a method and apparatus for controlling the deferred execution of user requests in a data processing system.

2. Description of the Related Art

Modern state-of-the-art data processing systems have become quite complex. In particular, so-called "distributed" data processing systems may include thousands of terminals, work stations or main frame computers which may be geographically distributed over thousands of miles. An advantage of such systems is the decentralization of various capabilities such that each element of the data processing system need not include all capabilities of the system.

For example, a single database server may be utilized to couple database queries to a selected database for many users, obviating any requirement to duplicate the contents of the database at multiple locations. Similarly, a centrally located library server may be utilized to store and access thousands of documents or other objects for many users within the data processing system.

The advent of distributed data processing systems in which a single server provides service for a selected application for multiple users has lead to the utilization of request deferral systems in order to avoid bottlenecks and wasted time. A user may make a request and find the server unavailable and thereafter enter the request as a deferred request. At a subsequent time when the server is available, such a deferred request will be executed.

One problem which exists in such systems is the inability of a deferred application request service to efficiently prioritize a large number of deferred requests. Typically, deferred requests are merely executed, as possible, in a first-in, first-out manner.

Thus, it should be apparent that a need exists for a method and apparatus which permits the efficient prioritization of multiple deferred requests in accordance with a user selectable set of attributes.

SUMMARY OF THE INVENTION

It is therefore one object of the present invention to provide an improved data processing system.

It is another object of the present invention to provide an improved distributed data processing system which permits the deferred execution of application software requests.

It is yet another object of the present invention to provide an improved method and apparatus for controlling the deferred execution of user requests in a data processing system.

The foregoing objects are achieved as is now described. The method and apparatus of the present invention includes a plurality of user defined attributes which may include a desired time of execution, a relative importance assigned, a ranking of the request security level and an indication of the organization level of the user for each deferred request. A deferred application request service is then established and utilized to evaluate the attributes associated with each deferred user request. The order of execution of each deferred request is then determined by the evaluation of each of these user specified attributes, in a specified order. A user specified precedence value for each attribute may be utilized in order to resolve conflicts in the order of execution between multiple deferred requests.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
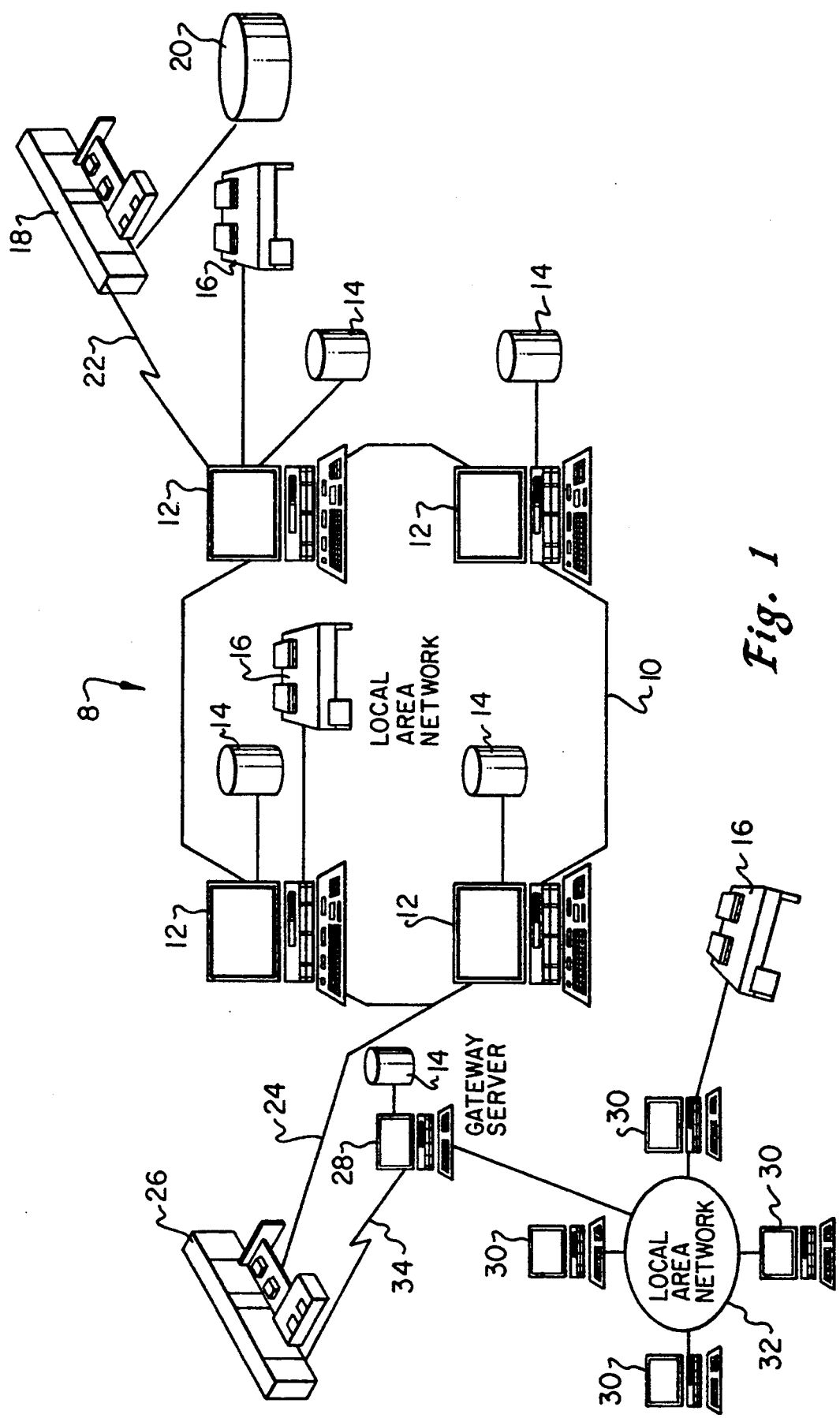
FIG. 1 is a pictorial depiction of a distributed data processing system which may be utilized to implement the method and apparatus of the present invention.

With reference now to the figures and in particular with reference to FIG. 1, there is depicted a pictorial representation of a distributed data processing system 8 which may be utilized to implement the method and apparatus of the present invention. As may be seen, distributed data processing system 8 may include a plurality of networks, such as Local Area Network (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such distributed data processing systems, each individual computer may be coupled to a storage device 14 and/or a printer/output device 16. One or more such storage devices 14 may be utilized, in accordance with the method and apparatus of the present invention, to store the various deferred requests which may be periodically entered by a user within distributed data processing system 8, in accordance with the method and apparatus of the present invention. In a manner well known in the prior art, each such deferred request may be stored within a storage device 14 which is associated with a deferred application request service, which is responsible for maintaining and executing all such deferred requests.

Still referring to FIG. 1, it may be seen that distributed data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for a Local Area Network (LAN) 10 and may be coupled via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects, databases or documents may be stored within storage device 20 and controlled by mainframe computer 18, as resource manager or library service for the data objects and documents thus stored. Of course, those skilled in the art will appreciate that mainframe computer 18 may be located a great geographical distance from Local Area Network (LAN) 10 and similarly, Local Area Network 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a database, data object or document stored in another portion of distributed data processing network 8. In order to maintain a semblance of order within distributed data processing network 8, it is often desirable to implement an access control program. This is generally accomplished by designating a server for a database or group of documents and then granting authority to each user with regard to those documents via the designated server. However, as those skilled in the art will appreciate, it is often necessary to defer a request for a document or database access due to the large number of users which may be present within distributed data processing network 8. Therefore, it should be obvious that a need exists for a method and apparatus whereby the deferred execution of user requests within a distributed data processing system may be controlled.

Figures 2, 3:
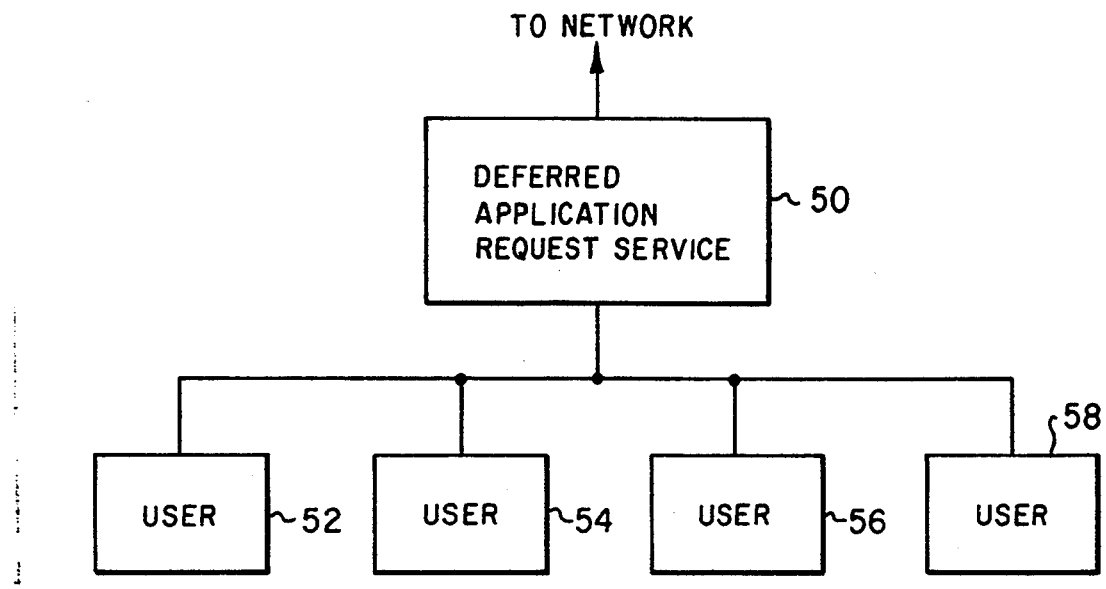
FIG. 2 is a block diagram of a deferred application request service with multiple users which may be utilized to implement the method and apparatus of the present invention.
FIG. 3 is a pictorial representation of a Precedent Vector Object (PVO) which may be utilized by the deferred application request service of FIG. 2 to implement the method and apparatus of the present invention.

Referring now to FIG. 2, there is depicted a block diagram of a deferred application request service with multiple users which may be utilized to implement the method and apparatus of the present invention. As is illustrated, a deferred application request service 50 is interposed between a plurality of users 52, 54, 56, and 58 and a portion of distributed data processing network 8 illustrated in FIG. 1. In accordance with the method of the present invention, any deferred request by a user coupled to deferred application request service 50, a service which is provided within distributed data processing network 8 (see FIG. 1), is transmitted to deferred application request service 50 for execution at a subsequent time.

With reference now to FIG. 3, there is depicted a pictorial representation of a Precedent Vector Object (PVO) which may be utilized by deferred application request service 50 of FIG. 2 to implement the method and apparatus of the present invention. As illustrated, Precedent Vector Object (PVO) 60 includes a plurality of rows and columns. The uppermost field in each column 62, 64, 66 and 68 includes a precedence value which will be assigned to each of the user defined attributes contained within each column.

For example, column 62 is the attribute which is defined as the "time after the request" and which is defined as having the highest priority (A) of the four attributes. Next, column 64, the "user assigned importance" attribute has the second highest priority (B). Thereafter, column 66, "security rating of request" has the third highest priority (C) and column 68, "ranking of the user" has the least priority (D) of any attribute within the Precedence Vector Object (PVO).

Each of these attributes is defined within row 70 of Precedent Vector Object (PVO) 60. Additionally, a criteria operator is listed for each attribute within row 72 of Precedent Vector Object (PVO) 60. The criteria operator specifies the criteria by which the values for each individual deferred request are to be evaluated, within each attribute, to determine the relative precedence between multiple requests.

For example, the "time after request" attribute represents the amount of time which has elapsed after the requested deferred time. For example, for the file request identified by the unique identifier "File 1234," ten minutes has expired past the deferred request time. That is, if the user had requested to defer this request until 10:00 a.m., a value of 10 in row 74 of column 62 indicates that the current time is 10:10 a.m. The criteria operator ">" listed within row 72 of column 62 indicates that the greater the value listed within each row of column 62, the greater the precedence of that request. Thus, in a comparison of the four deferred requests listed in rows 74, 76, 78 and 80, the request depicted in row 74 has the greatest precedence and will be executed first.

The criteria operator for the "user assigned importance" attribute listed in column 64 is "<." This criteria operator indicates that the lower the value contained within each field of column 64 for rows 74, 76. 78 and 80, the greater the precedence of this attribute. Thus, the user should assign the lowest number to those requests which have the highest priority for that user. A request having a user assigned importance of "1" will therefore be executed prior to a user request having a user assigned importance of "2."

Similarly, the criteria operator for the "security rating of request" attribute listed within column 66 is also "<" and thus, any request having a lower number within the field associated with this column will be assigned a greater precedence than a request having a higher number. Finally, the attribute listed within column 68, the ranking of the user within an organization, has a criteria operator of ">," indicating that the higher the number within an associated field, the greater the priority of that request. Of course, those skilled in the art will appreciate that the criteria operator could be reversed, if the operator user desires to assign higher numbers for certain priority values.

Thus, by creating a Precedence Vector Object, such as Precedent Vector Object 60 of FIG. 3, and by assigning a plurality of user defined attributes to that Precedent Vector Object, a plurality of deferred requests may be simply and easily considered for execution in a desired priority. In the depicted embodiment of the present invention, the time for execution is given the greatest priority, followed by the importance assigned to that request by the user. Of course, by permitting user defined attributes to be utilized to determine the priority of a plurality of deferred requests, these definitions may be changed to permit a user to specify entirely different attributes in a different priority order.

Figure 4:
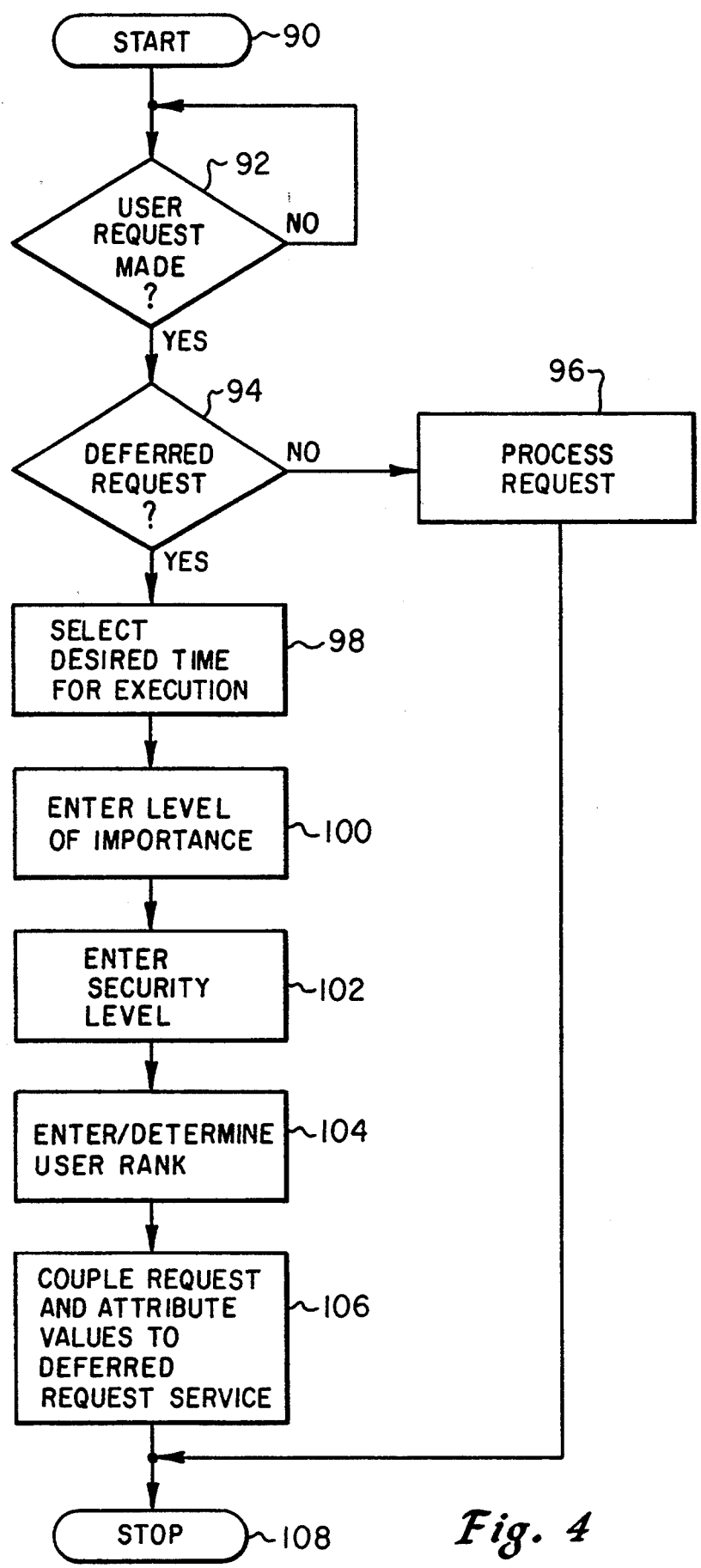
FIG. 4 is a high level flow chart depicting the establishment of a deferred request in accordance with the method and apparatus of the present invention.

With reference now to FIG. 4, there is depicted a high level flow chart which illustrates the establishment of a deferred request in accordance with the method and apparatus of the present invention. As illustrated, the process begins at block 90 and thereafter passes to block 92, which illustrates a determination of whether or not a user request has been made. If not, the process merely iterates until such time as a user request is entered. Next, block 94 depicts a determination of whether or not the user request which has been made is to be deferred. If not, the process passes to 96 which illustrates the processing of the request. Thereafter, the process terminates, as illustrated in block 108.

Referring again to block 94, in the event the user request which has been made is to be deferred, as determined in block 94, then block 98 illustrates the selection of the desired time of execution. Next, block 100 illustrates the prompting of the user to enter a desired level of importance for this request. Thereafter, block 102 illustrates the entry of a security level for the request and block 104 depicts the entry of the user's rank within the organization. Of course, those skilled in the art will appreciate that the users rank within the organization may be determined automatically by reference to the user I.D. which was established during logging on within the system.

At this point, block 106 illustrates the coupling of the request to a deferred application request service in conjunction with the values for the various attributes which will be utilized to determine the order of priority of execution of that request. Thereafter, the process terminates, as depicted in block 108.

Figure 5:
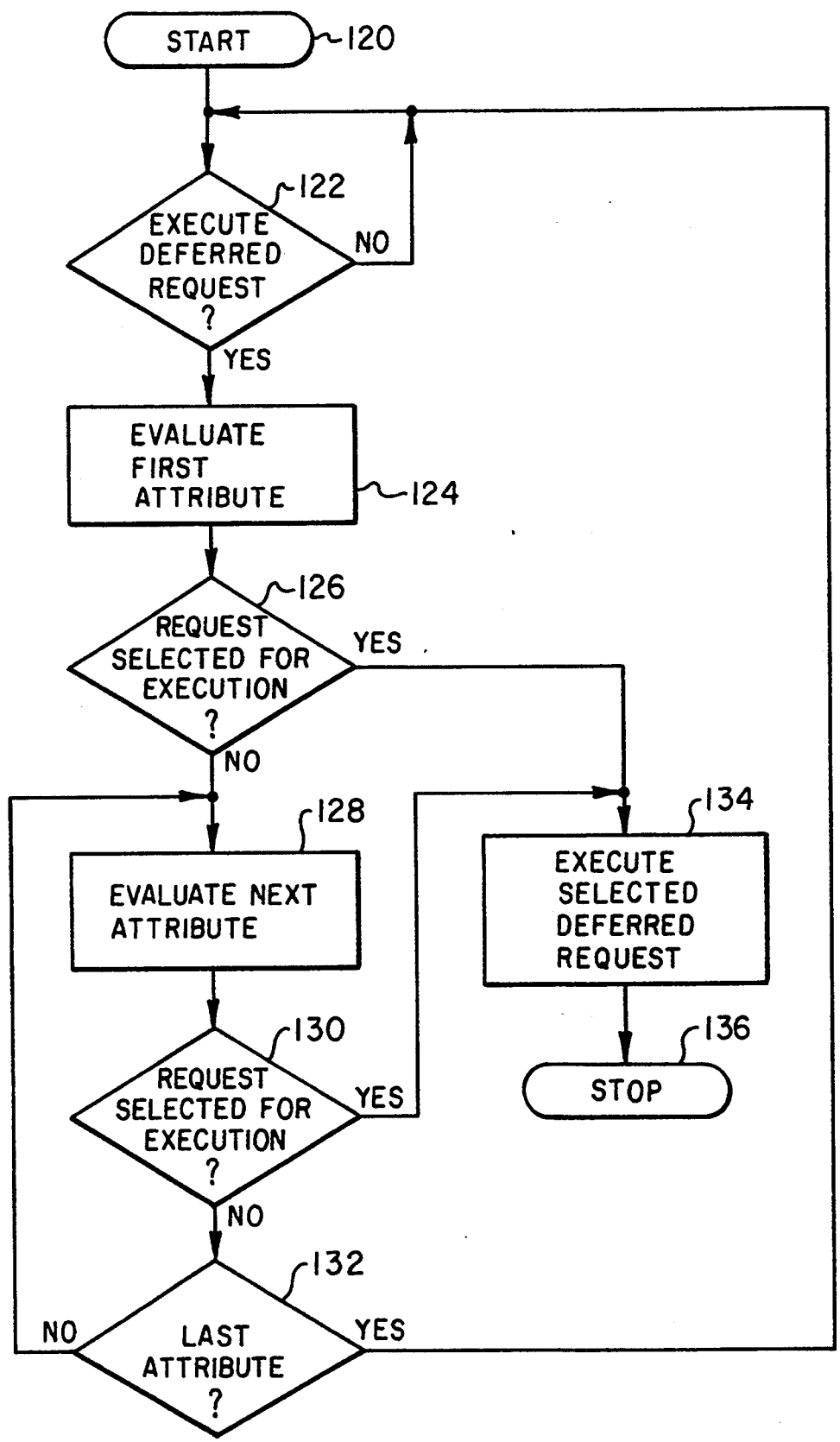
FIG. 5 is a high level flow chart depicting the execution of a deferred request in accordance with the method and apparatus of the present invention.

Finally, with reference to FIG. 5, there is depicted a high level flow chart which illustrates the execution of a deferred request in accordance with the method and apparatus of the present invention. As above, the process begins at block 120 and thereafter passes to block 122 which illustrates a determination of whether or not the execution of a deferred request is desired. If not, the process merely iterates until such time as a deferred request is ready for execution. Of course, those skilled in the art will appreciate that the execution of a deferred request may be attempted at regularly scheduled intervals, or upon the execution of some other event within the system.

After determining that it is desired to execute a deferred request, block 124 illustrates an evaluation of the first attribute within Precedent Vector Object 60 (see FIG. 3). By "first attribute" what is meant is the user defined attribute having the highest precedence, as assigned by the user. Next, block 126 illustrates a determination of whether or not a request has been selected for execution in accordance with the results of this first evaluation. If so, the process passes to block 134 which illustrates the execution of the deferred request and the process then terminates, as depicted in block 136.

Referring again to block 126, in the event the evaluation of the first attribute within the Precedent Vector Object has not resulted in the selection of a request for execution, the process passes to block 128 which illustrates the evaluation of a next attribute, in the order defined by the Precedent Vector Object. Thereafter, the process passes to block 130, which illustrates a determination of whether or not a deferred request has been selected for execution as a result of the evaluation of the next attribute within Precedent Vector Object 60. If so, the process again passes to block 134, which illustrates the execution of the deferred request and thereafter, the process terminates, as depicted in block 136.

Referring again to block 130, in the event the evaluation of the next attribute does not result in a request being selected for execution, indicating a tie in the evaluation of these attributes, the process passes to block 132. Block 132 illustrates a determination of whether or not the attribute under evaluation is the last attribute within the Precedent Vector Object and if not, the process returns to block 128 to examine the next attribute within the Precedent Vector Object. However, in the event the attribute under evaluation is the last attribute within the Precedent Vector Object, the process returns to block 122 in an iterative manner. In the unlikely event multiple deferred request have been evaluated and each request has an identical precedence value, the system will execute all of these requests in a manner specified for this condition, such as "first-in, first-out."

Upon reference to the foregoing, those skilled in the art will appreciate that the Applicants in the present application have invented a technique whereby a Precedent Vector Object may be defined by one or more users within a distributed data processing system to control the priority of execution of a plurality of deferred requests. By permitting a user to specify a plurality of attributes and assign a defined precedence value to each attribute, a plurality of deferred requests may be simply and easily examined to determine whether or not a particular request has sufficiently high priority to be executed at a given time.

While the invention has been particularly shown and described with reference to a preferred embodiment, it will be understood by those skilled in the art that various changes in form and detail may be made therein without departing from the spirit and scope of the invention.

We claim:

1. A method in a data processing system for controlling the deferred execution of user requests from a plurality of users within said data processing system, said method comprising the steps of:

associating a plurality of predetermined attributes with each user request within said data processing system for which deferred execution is desired, said plurality of predetermined attributes including at least a requested time of execution and a user assigned priority for each user request;

communicating each of a plurality of user requests for which deferred execution is desired and said associated plurality of predetermined attributes to a deferred application request service;

evaluating at least one of said plurality of predetermined attributes associated with each of said plurality of users requests within said deferred application request service; and thereafter, automatically executing said plurality of user requests for which deferred execution is desired in a selected priority order determined in accordance with said evaluation.

2. The method in a data processing system for controlling the deferred execution of user requests according to claim 1, wherein one of said plurality of predetermined attributes comprises a security rating of an associated user request.

3. The method in a data processing system for controlling the deferred execution of user requests according to claim 1, wherein one of said plurality of predetermined attributes comprises an indication of a user's rank within an organization for a selected user request.

4. The method in a data processing system for controlling the deferred execution of user requests according to claim 1, wherein said step of evaluating all of said plurality of predetermined attributes associated with each of said plurality of user requests within said deferred application request service comprises the step of assigning a priority value to each of said plurality of predetermined attributes prior to evaluating all of said plurality of predetermined attributes associated with each of said plurality of user requests within said deferred application request service.

5. A data processing system for controlling the deferred execution of users requests from a plurality of users within said data processing system, said data processing system comprising:

means for associating a plurality of predetermined attributes with each user request within said data processing system for which deferred execution is desired within said data processing system, said plurality of predetermined attributes including at least a requested time of execution and a user assigned priority for each user requests;

means for communicating each of said plurality of user requests for which deferred execution is desired and said plurality of predetermined attributes to a deferred application request service within said data processing system;

means for evaluating at least one of said plurality of predetermined attributes associated with each of said plurality of user requests within said deferred application request service within said data processing system; and means for automatically executing said plurality of user requests for which deferred execution is desired in a selected priority order within said data processing system determined in accordance with said evaluation.

* * * * *